(No Model.)
E. F. ALLEN.
SAW GUIDE.
No. 279,515. Patented June 19, 1883.
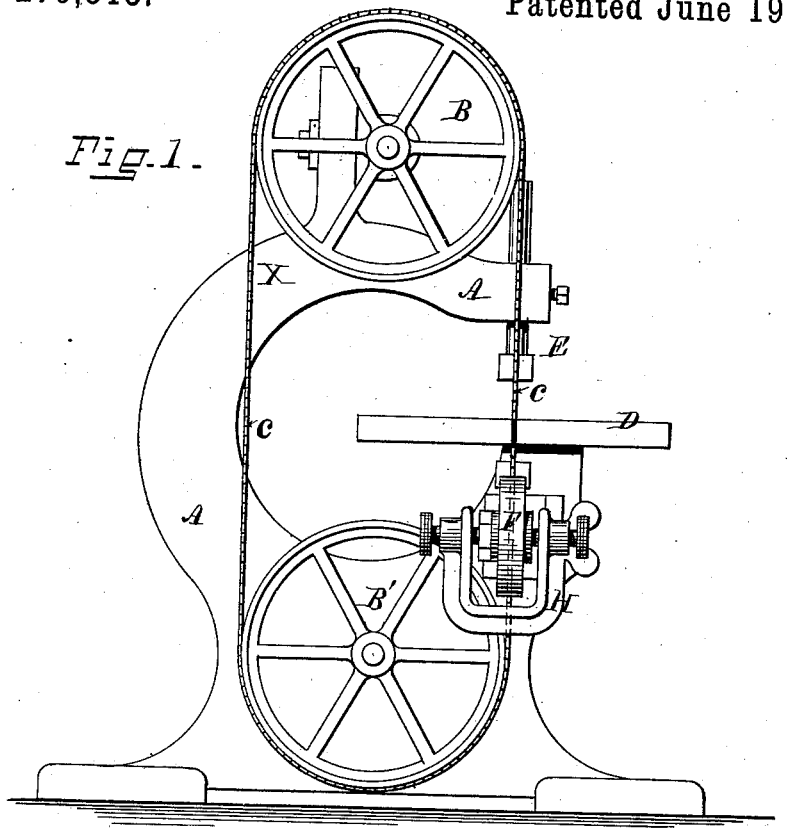
Fig. 1.
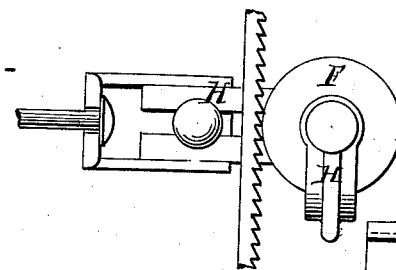
Fig. 2.
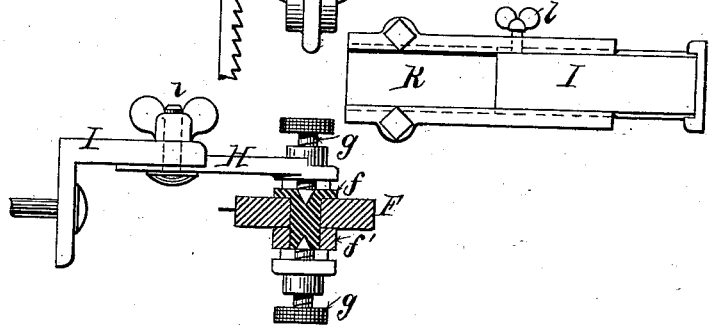
Fig. 3.
Fig. 4.
WITNESSES.
C. H. Luther Jr.
M. F. Beigh
INVENTOR.
Edwin F. Allen
by Joseph A. Miller & Co
Attys

UNITED STATES PATENT OFFICE.

EDWIN F. ALLEN, OF PROVIDENCE, RHODE ISLAND.

SAW-GUIDE.

SPECIFICATION forming part of Letters Patent No. 279,515, dated June 19, 1883.

Application filed September 26, 1882. (No model.)

*To all whom it may concern:*

Be it known that I, EDWIN F. ALLEN, of the city and county of Providence, and State of Rhode Island, have invented a new and useful Improvement in Band-Saws; and I hereby declare the following is a full, clear, and exact description of the same, reference being had to the accompanying drawings, forming part of this specification.

Band-saws are liable in use to run off from the pulleys on which they run, cause injury to the work in process of sawing, endanger the operative, usually break the saw, and cause thereby loss in time and cost for repairs. Such band-saws do not run off from the rear of the pulleys, as the guide for holding the work on the table forms a convenient guide for the smooth rear edge of the band-saw; but the cutting-edge has not heretofore been protected or guided so as to maintain the band-saw on the pulleys. To guide the cutting-edge of a band-saw and prevent the saw from running off from the pulleys without injuring the cutting-edge of the teeth is the object of this invention.

The invention consist in the peculiar and novel construction of an adjustable guide-disk, secured to the frame of a band-saw and arranged to bear against the cutting-edge of the band-saw, so as to maintain the same in the proper position on the pulleys, as will be more fully set forth hereinafter.

Figure 1 is a side view of a band sawing-machine provided with my improved safety-guide. Fig. 2 is an enlarged view, showing the safety-guide in contact with the cutting-edge of the band-saw. Fig. 3 is a top view of the adjustable bracket in which the safety-guide is supported and a sectional view of the guide-disk. Fig. 4 is a view of a slide secured to the frame of the machine, in which the adjustable bracket is supported.

In belt-saws the saw forms a belt which passes over the two pulleys, one above and the other below the work-table. In guiding such a belt properly, the guide must be placed so as to guide the belt as it runs on the pulley. In Fig. 1 the safety-guide is shown as placed below the work-table so as to guide the belt-saw on the lower pulley, and I prefer to place the safety-guide in this position; but it may be placed in front of the upper pulley, at a point marked X in Fig. 1, and guide the belt-saw onto the upper pulley, being as effectual in preventing the saw from running off from the pulleys in one as in the other position.

In the drawings, A is the frame of the band sawing-machine. B is the upper and B' the lower pulley, over which the endless band-saw C is placed, the lower pulley, B', being usually the driven and the upper pulley, B, the loose pulley. D is the table on which the work is supported. E is the stop for holding the work onto the table, and also forming a guide for the saw. F is a disk made of wood, leather, paper, or other analogous material, which, while guiding the saw, will not injure the cutting-edges of the saw. The disk F is secured on the bush *f*, provided with a circular shoulder on one end and a screw-threaded nut, *f'*, on the other end, so that the disk F can be readily removed when worn. The disk so secured to the bush *f* is mounted on the two pointed screws *g g*, having milled heads, so that they can be readily adjusted and allow the disk F to turn freely in contact with the toothed edge of the band-saw without offering any resistance to its movement or injuring the teeth. The pointed screws *g g*, on which the disk turns, are supported in the U-shaped end of the bracket H, the arm of the bracket being slotted and resting in ways formed in the bracket I, so that the same may be adjusted to bear lightly on the cutting-edge of the band-saw and be firmly secured in that position by the thumb-screw *i*, as is shown in Figs. 2 and 3. The bracket I is also slotted on the arm by which it secured to the frame of the machine, so as to allow of the lateral adjustment of the same and with it of the adjustment of the disk F exactly to the edge of the saw. To facilitate such lateral adjustment the bracket I may be made to slide in ways formed in the plate K, which is secured to the frame of the machine, and when properly adjusted the bracket I may be secured by the clamp-screw *l*, as is shown in Fig. 4.

I do not wish to confine myself to the specific details shown for adjusting and securing the disk F, as these may be modified without changing the operation of the device, so long as the disk F can rotate freely in contact with the saw, and is held firmly to guide the saw onto the pulley.

Having thus described my invention, I claim as new and desire to secure by Letters Patent—

1. The combination, with the band-saw c, of the brackets I and H, provided with slides and the thumb-screw i, of the disk F and the pointed screws g g, forming the bearing for the disk, the whole constructed to form an adjustable guide for the saw, as described.

2. In a band-saw, the combination, with the adjustable bracket H and the pointed screws g g, of the threaded bush f, nut f', and the annular disk F, constructed to support the disk and permit its ready renewal, as described.

EDWIN F. ALLEN.

Witnesses:
F. M. ALLEN,
J. A. MILLER, Jr.